(12) United States Patent
Debaecker (10) Patent No.: US 11,568,067 B2
(45) Date of Patent: Jan. 31, 2023

(54) SMART DIRECT ACCESS

(71) Applicant: SAP SE, Walldorf (DE)

(72) Inventor: Stephane Debaecker, Argenteuil (FR)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 17/027,555

(22) Filed: Sep. 21, 2020

(65) Prior Publication Data

US 2022/0092194 A1 Mar. 24, 2022

(51) Int. Cl.
*G06F 16/2455* (2019.01)
*G06F 21/62* (2013.01)
*G06F 21/60* (2013.01)
*G06F 16/907* (2019.01)
*G06N 20/00* (2019.01)
*G06F 12/14* (2006.01)

(52) U.S. Cl.
CPC .......... *G06F 21/604* (2013.01); *G06F 16/907* (2019.01); *G06F 21/6227* (2013.01); *G06N 20/00* (2019.01); *G06F 12/145* (2013.01)

(58) Field of Classification Search
CPC .. G06F 21/604; G06F 16/907; G06F 21/6227; G06F 12/145; G06F 21/6218; G06N 20/00
See application file for complete search history.

(56) References Cited

U.S. PATENT DOCUMENTS

| | | | | |
|---|---|---|---|---|
| 2010/0198888 | A1* | 8/2010 | Blomstedt | G06F 16/40 707/827 |
| 2015/0163206 | A1* | 6/2015 | McCarthy | H04L 63/104 726/4 |
| 2018/0012143 | A1* | 1/2018 | Hansen | G06N 5/022 |
| 2022/0076164 | A1* | 3/2022 | Conort | G06N 20/00 |

FOREIGN PATENT DOCUMENTS

| | | | | |
|---|---|---|---|---|
| WO | WO-2019226363 | A1 * | 11/2019 | G06F 16/285 |
| WO | WO-2019226363 | A9 * | 7/2020 | G06F 16/285 |

OTHER PUBLICATIONS

Fabrizi Andera, Why do you need a semantic layer for your Data lakes, Mar. 12, 2019 (Year: 2019).*
Anonymous "SAP Business Objects Web Intelligence User's Guide", Nov. 15, 2018, pp. 1-11, 19, 36-45, 59-61 and 71-73.

* cited by examiner

*Primary Examiner* — Joseph P Hirl
*Assistant Examiner* — Aayush Aryal
(74) *Attorney, Agent, or Firm* — Fountainhead Law Group P.C.

(57) ABSTRACT

A computer system including in-memory cache storage may be used to store collections of metadata that provide a semantic layer for a query of a data source. The computer system may provide multiple users access to the metadata collection, using different security policies for the users, without duplicating the metadata collection in the in-memory storage. For instance, the computer system may retrieve the metadata collection and provide the first user access to the metadata collection based on a first security policy of the first user. The computer system may then provide a second user access to the metadata collection based on a second security policy of the second user, without the metadata collection being duplicated in the in-memory cache storage.

20 Claims, 6 Drawing Sheets

SMART DIRECT ACCESS

BACKGROUND

The present disclosure pertains to data generation and data access, and in particular to smart direct access of a semantic layer.

Software applications can be used to visualize and analyze large sets of data. Such applications may present the data in documents such as spreadsheets or text documents including visualizations (e.g., tables, graphs, and charts) of the data. The data presented in the document may be obtained from one or more data sources. The data for the document may be obtains by querying each of the data sources. A metadata collection or semantic layer may be generated and used to perform each query of each data source. The metadata collection may abstract the data complexity for accessing, manipulating, and organizing data. The data retrieved from the queries using the different metadata collection may be presented in the document to end users.

In certain systems, the metadata collection must be generated before making the corresponding query. This may ensure that the metadata collection is still a valid representation of the data source. However, the computational time and resources required to generate the metadata collection may be related to the size of the corresponding data source, or a portion thereof. Since the data source may include large sets of data, it may take a long time to generate the metadata collection, thereby delaying the query and presentation of the document to the user. Furthermore, since different users may have different security policies for accessing the data source, the metadata collection may be generated separately and differently for each user. As such, the computational time and resources used for generating the metadata collection may be duplicated for each user accessing the same document. As such, loading the document may be a slow and resource intensive process.

The present disclosure addresses these issue and others, as further described below.

SUMMARY

One embodiment provides a computer system. The computer system includes one or more processors. The computer system also includes in-memory cache storage coupled to the one or more processors. The computer system also includes one or more machine-readable medium coupled to the one or more processors. The one or more machine-readable medium store computer program code that include sets instructions, which are executable by the one or more processors. The instructions are executable to obtain a first request for a first user to access a metadata collection providing a semantic layer for a query of a data source. The instructions are further executable to determine whether the metadata collection corresponding to the query is stored in the in-memory cache storage. The instructions are further executable to retrieve the metadata collection from the in-memory cache storage. The instructions are further executable to provide the first user access to the metadata collection based on a first security policy of the first user. The instructions are further executable to obtain a second request for a second user to access the metadata collection. The instructions are further executable to provide the second user access to the metadata collection based on a second security policy of the second user. The first user and the second user capable of accessing the metadata collection without the metadata collection being duplicated in the in-memory cache storage.

In some embodiments, The instructions are further executable to determine that the metadata collection corresponding to the query is not stored in an in-memory cache storage. In such embodiments, The instructions are further executable to determine that the metadata collection is stored at a central management system and retrieve the metadata collection from the central management system. In such embodiments, The instructions are further executable to store the metadata collection retrieved from the central management system in the in-memory cache storage.

In some embodiments, The instructions are further executable to determine that the metadata collection corresponding to the query is not stored in an in-memory cache storage. In such embodiments, The instructions are further executable to determine that the metadata collection is not stored at a central management system and generate the metadata collection. In such embodiments, The instructions are further executable to store the generated metadata collection in the in-memory cache storage and send the generated metadata collection to the central management system for storage.

In some embodiments, The instructions are further executable to generate a machine learning model based on records indicating times and frequency of access to the metadata collection. In such embodiments, The instructions are further executable to determine a predicted request to access the metadata collection at a predicted time based on the machine learning model. In such embodiments, The instructions are further executable to retrieve the metadata collection from a central management system in response to the determination of the predicted request and store the generated metadata collection in the in-memory cache storage. In such embodiments, The instructions are further executable to generate the metadata collection in response to the determination of the predicted request and store the generated metadata collection in the in-memory cache storage. In such embodiments, The instructions are further executable to determine a time period during which requests to access the metadata collection are not predicted based on the machine learning model and remove the metadata collection from the in-memory cache storage during the time period.

Another embodiment provides one or more non-transitory computer-readable medium storing computer program code. The computer program code includes sets of instructions to obtain a first request for a first user to access a metadata collection providing a semantic layer for a query of a data source. The computer program code further includes sets of instructions to determine whether the metadata collection corresponding to the query is stored in an in-memory cache storage. The computer program code further includes sets of instructions to retrieve the metadata collection from the in-memory cache storage. The computer program code further includes sets of instructions to provide the first user access to the metadata collection based on a first security policy of the first user. The computer program code further includes sets of instructions to obtain a second request for a second user to access the metadata collection. The computer program code further includes sets of instructions to provide the second user access to the metadata collection based on a second security policy of the second user. The first user and the second user capable of accessing the metadata collection without the metadata collection being duplicated in the in-memory cache storage.

Another embodiment provides a computer-implemented method. The method includes obtaining a first request for a first user to access metadata collection providing a semantic layer for a query of a data source. The method further includes determining whether the metadata collection corresponding to the query is stored in an in-memory cache storage. The method further includes retrieving the metadata collection from the in-memory cache storage. The method further includes providing the first user access to the metadata collection based on a first security policy of the first user. The method further includes obtaining a second request for a second user to access the metadata collection. The method further includes providing the second user access to the metadata collection based on a second security policy of the second user. The first user and the second user capable of accessing the metadata collection without the metadata collection being duplicated in the in-memory cache storage.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," "fifth," "sixth," "seventh," "eighth," "ninth," "tenth," etc., used herein do not necessarily indicate an ordering or sequence unless indicated. These terms may be used for differentiation between different objects or elements within specifying an order.

As mentioned above, certain software applications (e.g., analytics applications) can be used to visualize and analyze large sets of data. Such applications may present the data in documents such as spreadsheets or text documents including visualizations (e.g., tables, graphs, and charts) of the data. The data presented in the document may be obtained from one or more data sources. The data for the document may be obtains by querying each of the data sources. The queries for data may be made to a data warehouse server, a SQL database server, an in-memory database server, or to a central management server, for example. A metadata collection, which may also be referred to as "universe data," may be generated and used to perform each query of each data source. The metadata collection may abstract the data complexity for accessing, manipulating, and organizing data. The data retrieved from the queries using the different metadata collection may be presented in the document to end users.

In certain systems, the metadata collection must be generated before making the corresponding query. That is, the metadata collection is re-generated instead of being stored. This may ensure that the metadata collection is still a valid representation of the data source. However, the computational time and resources required to generate the metadata collection may be related to the size of the corresponding data source, or a portion thereof. Since the data source may include large sets of data, it may take a long time to generate the metadata collection, thereby delaying the query and presentation of the document to the user. Furthermore, since different users may have different security policies for accessing the data source, the metadata collection may be generated separately and differently for each user. The security policies may include view time settings and query settings. In addition, the metadata collection may also be re-generated for separate sessions of a user. As such, the computation time and resources used for generating the metadata collection may be duplicated for each user accessing the same document. As such, loading the document may be a slow and resource intensive process.

Features and advantages of the present disclosure include reducing the amount of computation time and resources spent generating metadata collection by enabling the metadata collection to be shared between users. In addition, metadata collection may also be shared across different user sessions. Furthermore, the metadata collection may only be generated if a particular query using that metadata collection has not been executed before or if metadata of the stored metadata collection has changed (e.g., the metadata collection is still valid). Further features and advantages of the present disclosure include reducing wait time for the users by pre-generating or pre-caching the metadata collection based on predicted access of the metadata collection determined using a machine learning model. These techniques are referred to as "smart data access" because they enable the metadata collection to be accessible before it is needed, and they allow the same metadata collection to be shared by multiple different users.

The smart data access techniques described below optimize the metadata collection generation for starting from a "query" or "view" on a database. Such a query or view may be used to populate a document containing tables or charts based on data retrieved from a database. A database "query" may comprise a request for data or information from a database table or combination of database tables (or other data structures) in the database. Queries are the mechanism for retrieving information from a database and generally consist of questions presented to the database in a predefined format. This data may be generated as results returned by the SQL, or as pictorials, graphs, etc. The results may be returned as a query response. A metadata collection may provide a semantic layer that abstracts the data complexity of the query by using familiar language rather than data language to access, manipulate, and organize data in the database. Thus, metadata collection may be used to simplify the creation process end-user queries. The metadata collection may include a plurality of metadata objects. For example, the metadata collection may include a collection of technical names from the database, characteristics of the data, attributes of the database, or other information about the database. The queries may be generated on top of the metadata collection. As further described below, the metadata collection may be generated once and shared with other users. In addition, the metadata collection may be shared with other clusters (e.g., other data access systems and the users of those other data access systems).

Figure 1:
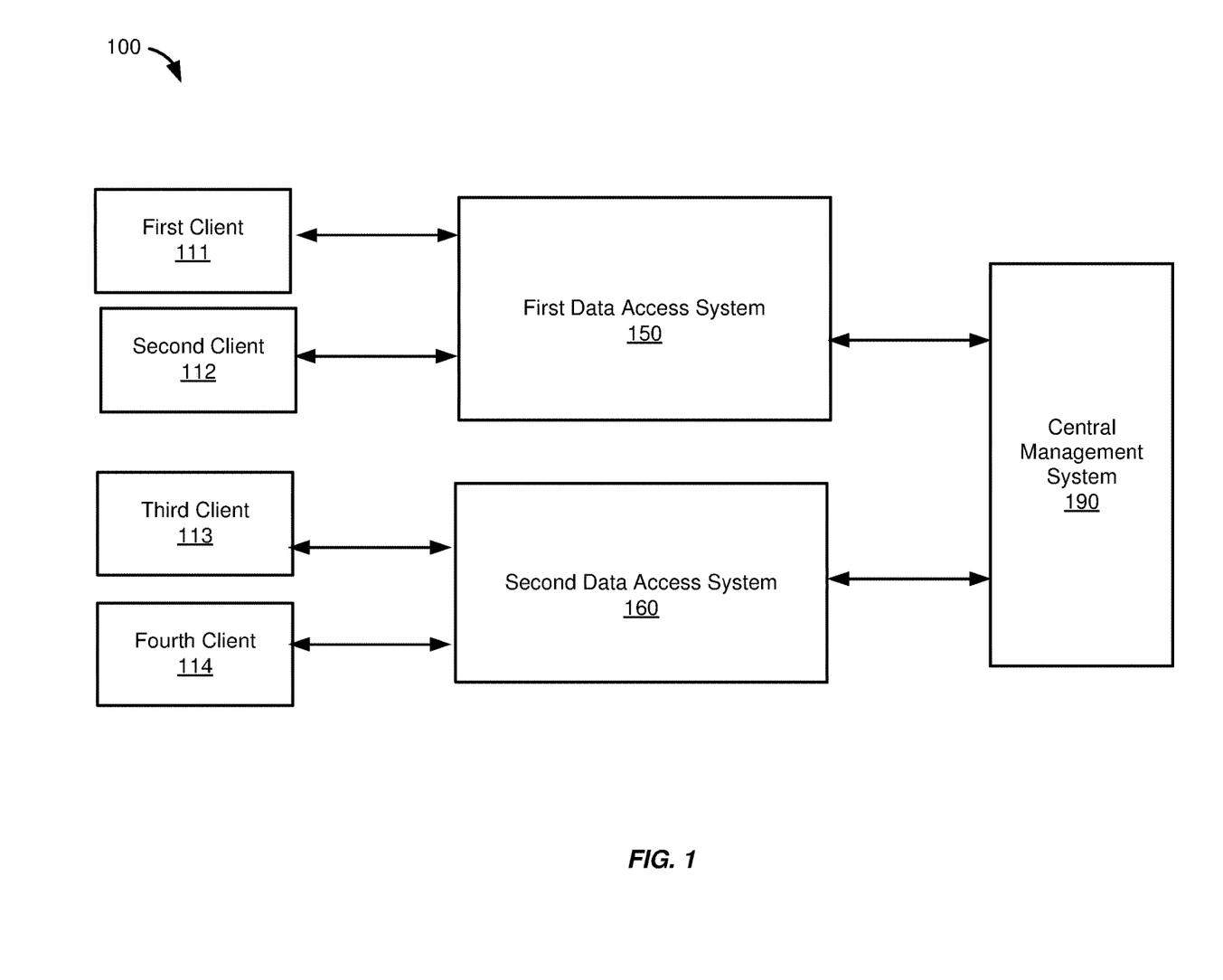
FIG. 1 shows a diagram of clients accessing data access systems in communication with central management system, according to an embodiment.

FIG. 1 shows a diagram 100 of clients 111-114 accessing data access systems 150, 160 in communication with central management system 190, according to an embodiment. The clients 111-114 may each be one of a desktop computer, a laptop computer, a smartphone, or a tablet, or another computing device. The data access systems 150, 160 may include one or more server computers, for example. The central management system 190 may include one or more server computers, for example. The clients 111-114, the data access systems 150, 160 and the central management systems may be in communication over a network. For example, the data access systems 150, 160 may communicate with the central management system 190 over the Internet, or an intranet, for example. The first client 111 and the second client 112 may communicate with the first data access system 150 over an intranet or the Internet, for example. The third client 113 and the fourth client 114 may communicate with the second data access system 160 over an intranet or the Internet, for example.

The first client 111 and the second client 112 are in communication with the first data access system 150. The third client 113 and the fourth client 114 may be in communication with the second data access system 160. The first data access system 150 may be in communication with the central management system 190. The second data access system 160 may also be in communication with the central management system 190. In some embodiments there may be additional clients and additional data access systems.

The clients 111-114 may be used by end-users to open documents based on queries of a database, such as a data warehouse. These queries may be made using a semantic layer defined by a metadata collection, as described herein. The first data access system 150 and the second data access system 160 may generate the metadata collection and provide the users with access to the metadata collection. The central management system 190 may include or access a database that stores documents, one or more metadata collections, and user's security profiles, for example. The central management system 190 may use disk-based storage for long-term storage of the metadata collection for various queries while the data access systems may store metadata collections in-memory. As further described below, the data access systems may retrieve a metadata collection from the central management system 190 when it is needed for a query. The processes performed by the data access system are further described below.

Figure 2:
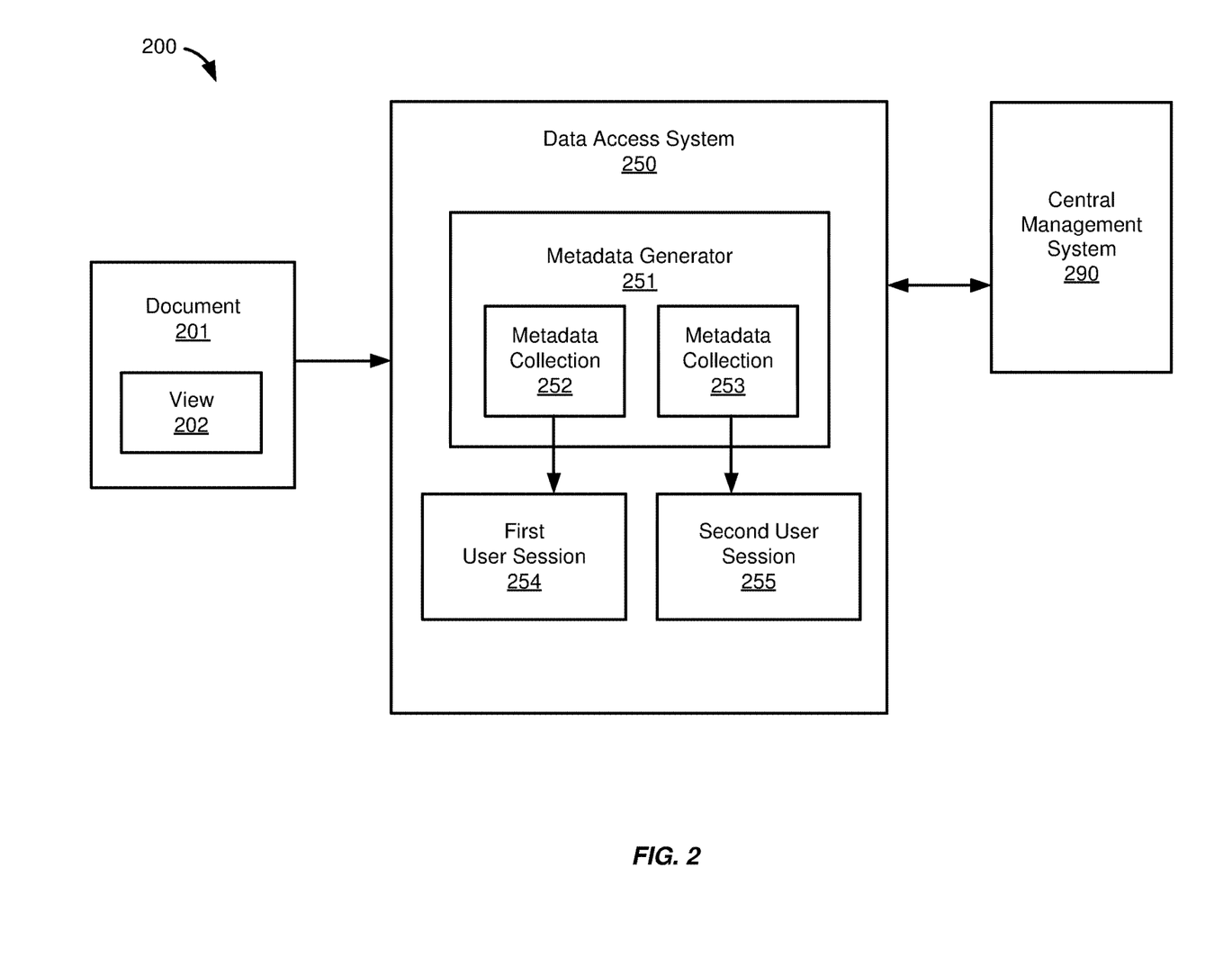
FIG. 2 shows a diagram of a data access system providing user sessions for accessing metadata collection, according to an embodiment.

FIG. 2 shows a diagram 200 of a data access system 250 providing user sessions 254 and 255 for accessing a metadata collection, according to an embodiment. The data access system 250 may include one or more server computers. The central management system 290 may include one or more server computers. The data access system 250 may be in communication with the central management server 290 over a network, such as an intranet or the Internet.

As shown in FIG. 2, a document 201 may be based on a view 202 of data (e.g., a query). The document 201 may be accessed by a first user through a first user session 254 and by a second user though a second user session 255. In this embodiment, the first user may access a first metadata collection 252 while the second user access a second metadata collection 253. That is, each user has access to their own separate metadata collection, which may be loaded in the memory of the data access system 250. In such embodiment, each time a user wants to open a new document using a query a new metadata collection may be generated and stored in the in-memory cache storage of the data access system. In some embodiments, if a user wants to use a query using a metadata collection, the new metadata collection is generated for the current user and only during the current session. That is, multiple users creating or refreshing a document cannot share the metadata collection, which lead to performance issues. Performance may be improved as further described below.

Figure 3:
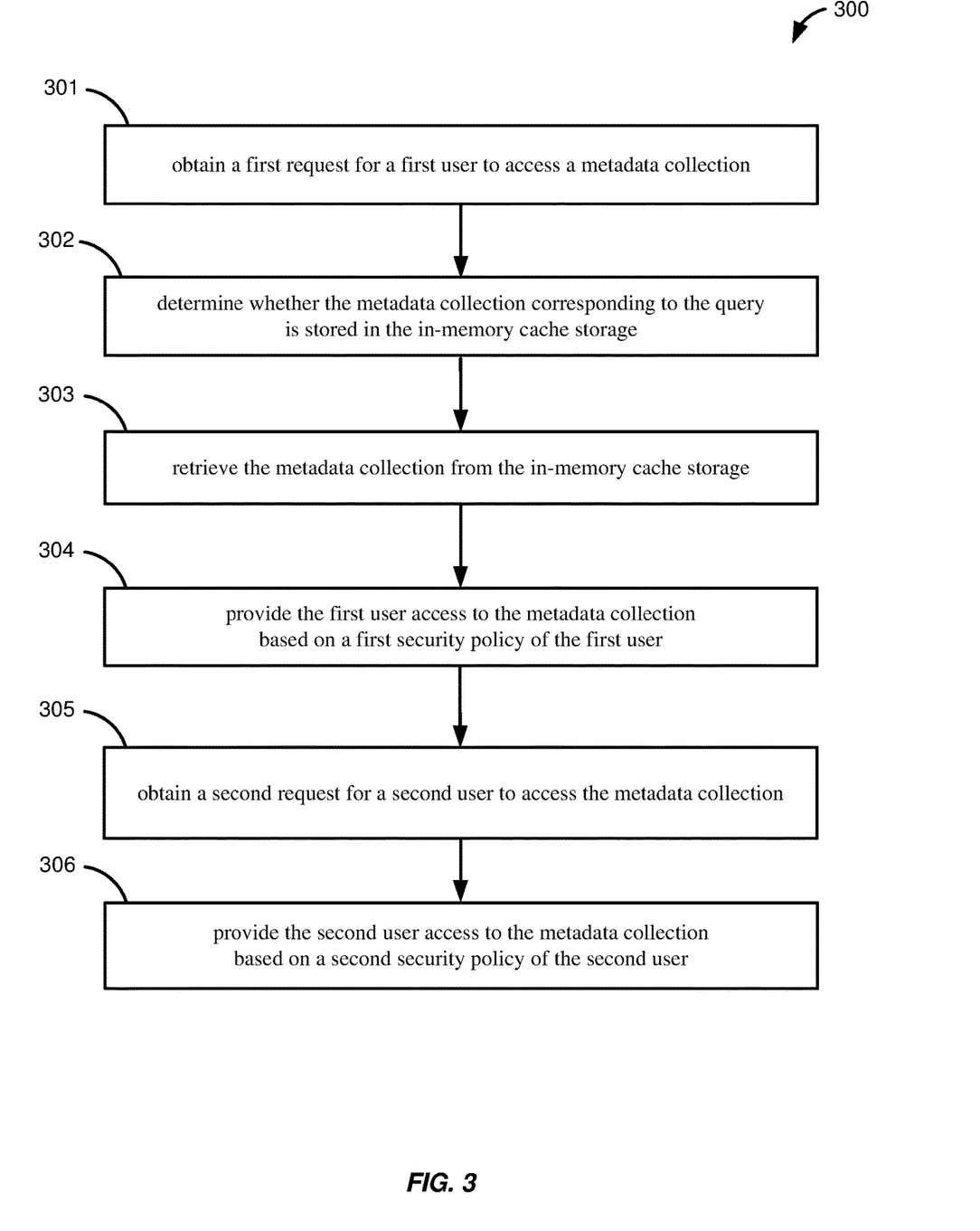
FIG. 3 shows a flowchart of an exemplary method for providing access to a metadata collection, according to an embodiment.

FIG. 3 shows a flowchart 300 of an exemplary method for providing access to a metadata collection, according to an embodiment. The method is a computer-implemented method performed by a computer system. For example, the method may be implemented by a data access system, such as the data access systems of FIGS. 1, 4, and 5. In some embodiments, the steps of the method may be performed in a different order, or by different systems, unless indicated otherwise.

At 301, the method may obtain a first request for a first user to access a metadata collection providing a semantic layer for a query of a data source. The query may be received from a client computer that loaded a document. The query may be used to populate the document with data from the data source. The metadata collection may include a plurality of metadata objects. For example, the metadata collection may include a collection of technical names from the database, characteristics of the data, attributes of the database, or other information about the database. The queries may be generated on top of the metadata collection.

At 302, the method may determine whether the metadata collection corresponding to the query is stored in an in-memory cache storage of the computer system. In some embodiments, the metadata collection may have been generated and then stored in the in-memory cache storage of the computer system. In other embodiments, the metadata collection may have been retrieved from a central management system, as described herein.

At 303, the method may retrieve the metadata collection from the in-memory cache. As described herein, the metadata collection may have been cached in the in-memory cache or it may have been retrieved from storage or from a central management system.

At 304, the method may provide the first user access to the metadata collection based on a first security policy of the first user. The security policy may be stored at the computer system, or it may be retrieved from a central management system. The security policy may be stored separate from the metadata collection such that different security policies for different users may be applied to the same metadata collection. In some embodiments, the security policy for a user may be applied as a filter to a shadow copy of the metadata collection for that user in order to limit which portions of the metadata collection are accessible to the user.

Prior solutions may embed security policies in a metadata collection, thereby requiring separate metadata collections for each user, thereby duplicating a large portion of the metadata collection's data in memory or storage. Features and advantages of this technique include allowing different security policies to be applied to the same metadata collection such that the metadata collection does not need to be duplicated in memory or storage, as further described herein.

At 305, obtain a second request for a second user to access the metadata collection. In some embodiments, the second request may be based on the second user opening the same document based on the same query that was opened by the first user.

At 306, provide the second user access to the metadata collection based on a second security policy of the second user. In some embodiments, the second security policy may be different from the first security policy such that the metadata collection and the data accessible by querying are different for the second user.

The first user and the second user may both accesses the metadata collection without the metadata collection being duplicated in the in-memory cache storage. In addition, the metadata collection may not be re-generated upon received the second request since the metadata collection may already be stored in the in-memory cache storage. This is advantageous because memory and storage space may be reduced compared to other techniques that require separate metadata collections for each user.

In some embodiments, the method may further determine that the metadata collection corresponding to the query is not stored in an in-memory cache storage. In such embodiments, the method may further determine that the metadata collection is stored at a central management system and retrieve the metadata collection from the central management system. In such embodiments, the method may further store the metadata collection retrieved from the central management system in the in-memory cache storage.

In some embodiments, the method may further determine that the metadata collection corresponding to the query is not stored in an in-memory cache storage. In such embodiments, the method may further determine that the metadata collection is not stored at a central management system and generate the metadata collection. In such embodiments, the method may further store the generated metadata collection in the in-memory cache storage and send the generated metadata collection to the central management system for storage.

In some embodiments, the method may further generate a machine learning model based on records indicating times and frequency of access to the metadata collection. In such embodiments, the method may further determine a predicted request to access the metadata collection at a predicted time based on the machine learning model. In such embodiments, the method may further retrieve the metadata collection from a central management system in response to the determination of the predicted request and store the generated metadata collection in the in-memory cache storage. In such embodiments, the method may further generate the metadata collection in response to the determination of the predicted request and store the generated metadata collection in the in-memory cache storage. In such embodiments, the method may further determine a time period during which requests to access the metadata collection are not predicted based on the machine learning model and remove the metadata collection from the in-memory cache storage during the time period.

The method for smart data access of FIG. 3 may be implemented in the systems shown in FIG. 4 and FIG. 5, as further described below.

Figure 4:
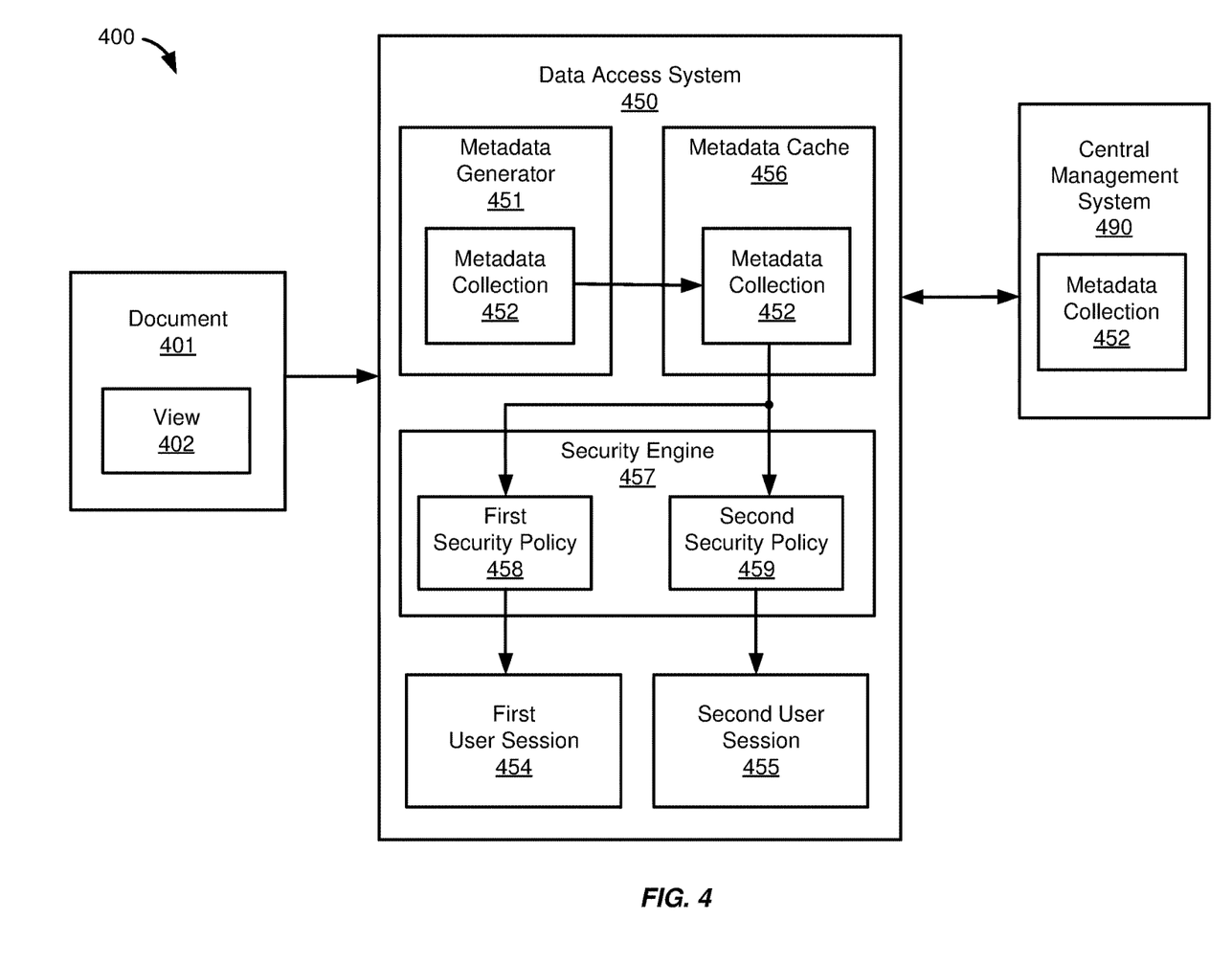
FIG. 4 shows a diagram of a data access system providing user sessions for accessing the same metadata collection using different security policies, according to an embodiment.

FIG. 4 shows a diagram 400 of a data access system 450 providing user sessions 454 and 455 for accessing the same metadata collection 452 using different security policies 458 459, according to an embodiment. The document 401 may be configured similar to the document described above with respect to FIG. 3. The data access system 450 may be configured similar to the data access systems described above with respect to FIG. 3, except as noted below. The central management system 490 may be configured similar to the central management system described above with respect to FIG. 3, except as noted below.

As shown in FIG. 4, a document 401 may be based on a view 402 of data (e.g., a query). The document 401 may be accessed by a first user through a first user session 454 and by a second user though a second user session 455. In this embodiment, the first user may access the metadata collection 452 which is also accessed by the second user. That is, both users share the same metadata collection such that it is not duplicated in-memory of the data access system 450. In addition, the metadata collection 452 is stored at the central management system 490 and it is retrievable from the central management system 490.

In order to allow both users to access the same metadata collection 452, the security profiles of the users may be applied as a filter to the metadata collection 452, thereby ensuring that the users are limited in access based on the permissions that they each have. If another user wants to open the document using the query, a new metadata collection is not generated, and instead the stored metadata collection is accessed from the metadata cache 456. This, the metadata collection 452, generated by the metadata generator 451, is only generated once and it is shared instead of being regenerated.

For example, if a first user opens the query and the metadata collection is generated, the metadata collection is stored in the metadata cache 450, and also in the central management system 490. If then a second user opens the same query, then the already generated metadata collection is retrieved, either from the metadata cache 456, if available, or else from the central management system 490. If either user is logged off from the session, they can access the same metadata collection without it needing to be regenerated. The metadata collection may be regenerated if the query has a timestamp younger than the metadata collection stored. Versioning check may be performed when a user opens metadata collection (e.g., when a document is created or refreshed) to maintain the consistency without cache.

In another example, a first user opens a query and the data access system checks whether the metadata collection is stored in the local in-memory metadata cache 456 or at the central management system 490. If the metadata collection already exists, then it is reused. If the metadata collection is already stored in the central management system 490, then it may be retrieved and stored in the in-memory metadata cache 456. If the metadata collection is not stored in the central management system 490, or if the query is younger than the metadata collection, then the metadata generator 451 may generated the metadata collection 452 and store it in the in-memory metadata cache 456, and then export it to the central management system 490. Then, if a second user requests to access the metadata collection, he will follow the same steps, sharing the metadata collection with the first user.

Figure 5:
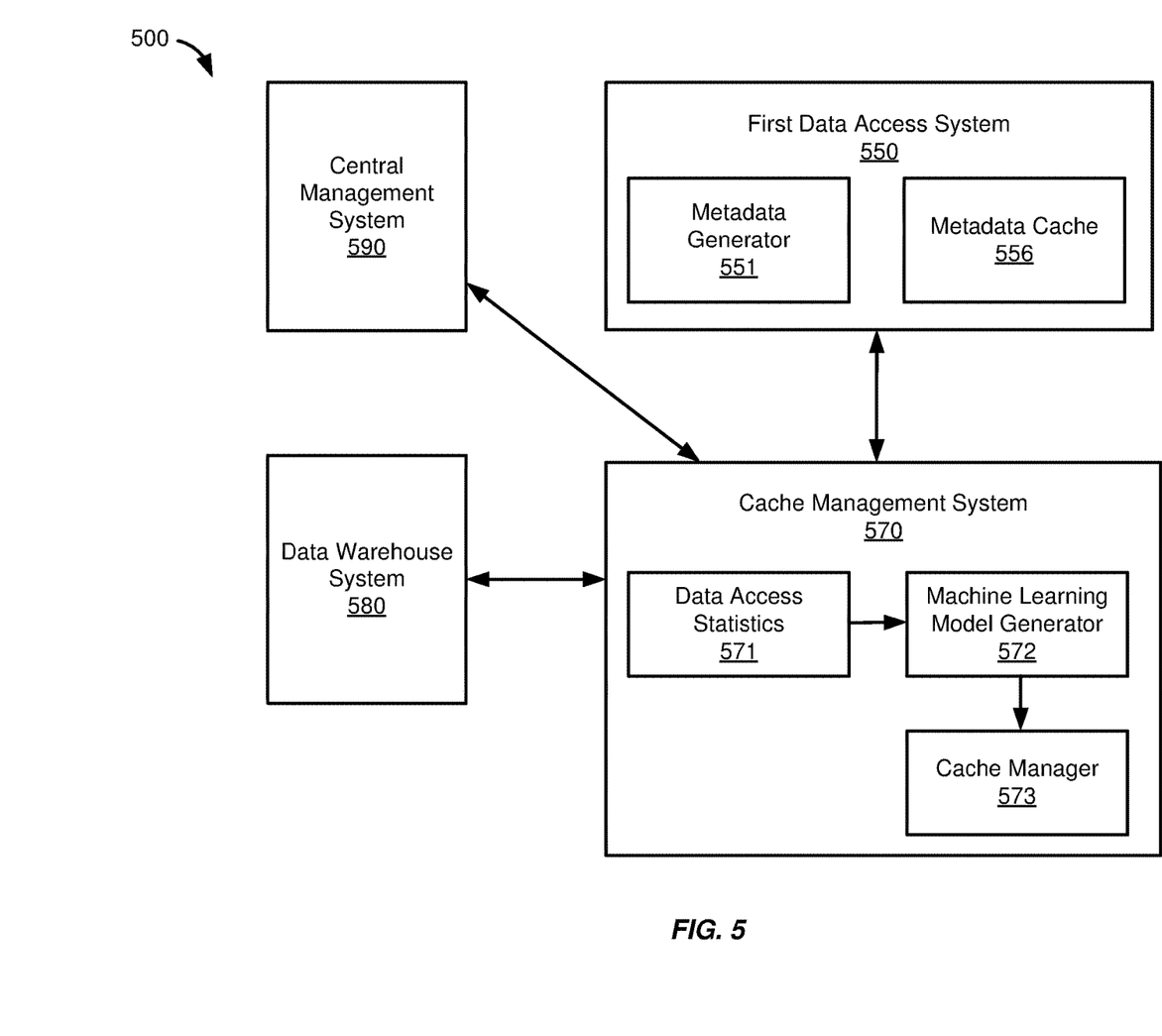
FIG. 5 shows a diagram of a cache management system generating a machine learning model for predicting metadata collection access, according to an embodiment.

FIG. 5 shows a diagram 500 of a cache management system 570 generating a machine learning model for predicting metadata collection access, according to an embodiment. The first data access system 550 may be configured similar to the data access system 450 described above and the central management system 590 may be configured similar to the central management system 490 described above. The data warehouse system 580 may store the data accessed by the queries. The cache management system 570 may be configured to retrieve data access statistics 571 of the documents and the metadata collection from the data warehouse system 580, the central management system 590, and the first data access system 550.

The data access statistics 571 may include information on who (which user or system) access the data, when the data was access (e.g., a time stamp), how frequently the data is accessed, how frequent each query is used for a given document, and which connection (e.g., connection type, credential types, etc.) was used to access a document, for example. The data access statistics 571 may include information on every document that has been accessed (e.g., each document that has been stored at a given central management server).

A machine learning model generator may generate a machine learning model for predicting data access based on the data access statistics 571. A cache manager 571 may use the machine learning model to trigger pre-generation and pre-loading of the metadata collection when it is predicted to be needed. For example, the metadata collection may be used during predictable intervals of the day, week, month, or year based on the machine learning model and the cache manager 571 may cause the data access system 550 to generate metadata collection predicted to be accessed, which may then be loaded into the metadata cache 556, and it may also be stored in the central management system 590. In some embodiments, the metadata collection predicted to be accessed may already be stored in the central management system 590 and it may be provided to the data access system 550 based on the predictive machine learning model.

In addition, the metadata collection stored in the data access system's metadata cache 556 and the metadata collection stored at the central management system 590 may be removed over time based on the metadata collection's access frequency. For example, certain metadata collection may be removed from storage during a time period when it is not predicted to be accessed. It may then be regenerated and reloaded before a time period when it is predicted to be accessed.

Figure 6:
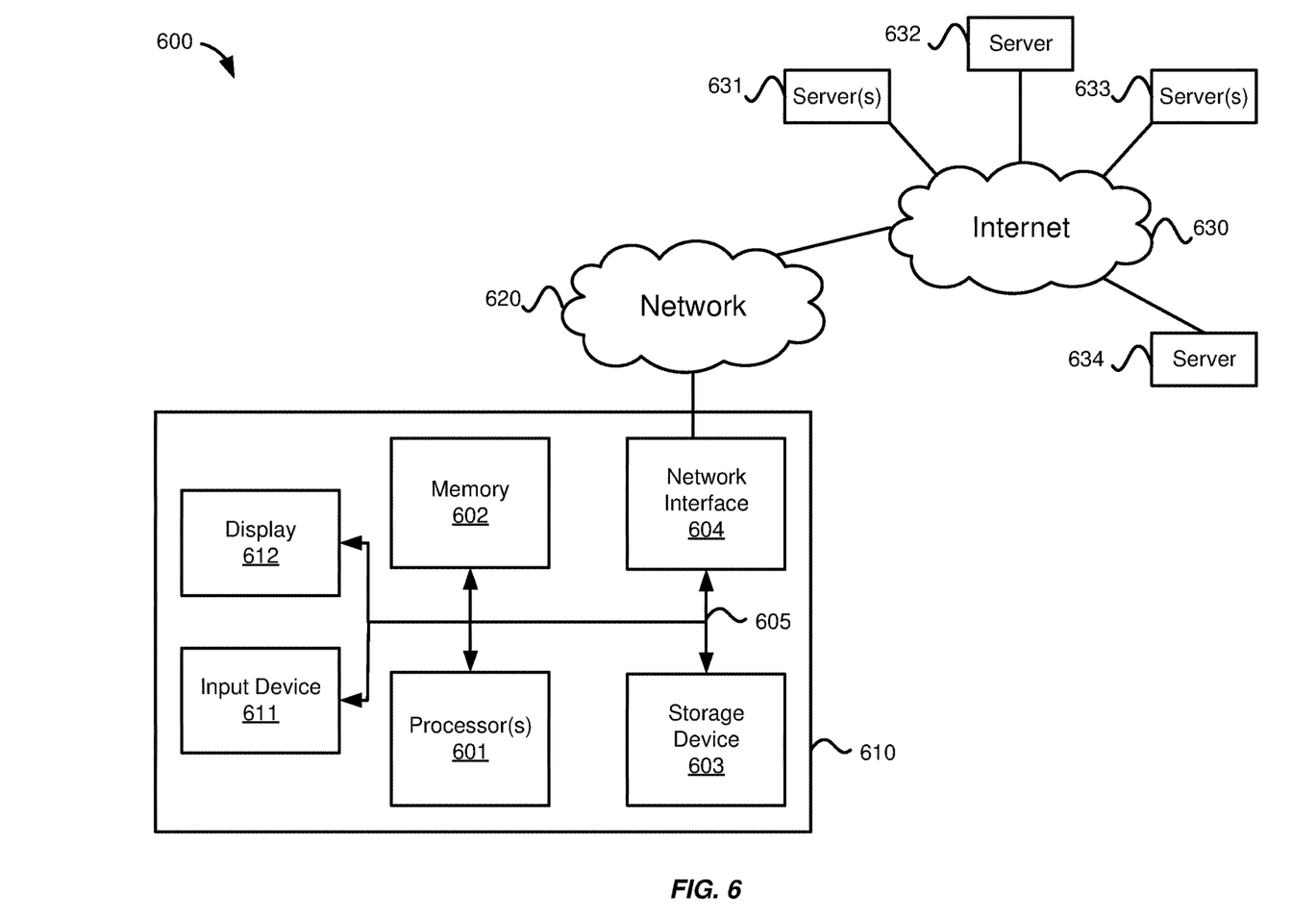
FIG. 6 shows a diagram of hardware of a special purpose computing machine for implementing smart data access techniques, according to an embodiment.

FIG. 6 shows a diagram of hardware of a special purpose computing machine for implementing smart data access techniques, as described above. The hardware shown in FIG. 6 may be used to implement the client computers, the data access systems, the central management system, and the cache management system described herein.

The computer system 610 includes a bus 605 or other communication mechanism for communicating information, and one or more processor(s) 601 coupled with bus 605 for processing information. The computer system 610 also includes a memory 602 coupled to bus 605 for storing information and instructions to be executed by processor 601, including information and instructions for performing some of the techniques described above, for example. This memory may also be used for storing programs executed by processor(s) 601. For example, the memory 602 may store programs executable by the processor(s) 601 to provide and use separate runtime data from metadata as described above. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

The computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

The computer system also includes a network interface 604 coupled with bus 605. The network interface 604 may provide two-way data communication between computer system 610 and a network 620. The network interface 604 may be a wireless or wired connection, for example. The computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

Features and advantages of the techniques described above include reducing the amount of computation time and resources spent generating metadata collection by enabling the metadata collection to be shared between users. In addition, metadata collection may also be shared across different user sessions. Furthermore, the metadata collection may only be generated if a particular query using that metadata collection has not been executed before or if metadata of the stored metadata collection has changed (e.g., the metadata collection is still valid). Further features and advantages of the present disclosure include reducing wait time for the users by pre-generating or pre-caching the metadata collection based on predicted access of the metadata collection determined using a machine learning model.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
in-memory cache storage coupled to the one or more processors;
one or more machine-readable medium coupled to the one or more processors and storing computer program code comprising sets instructions executable by the one or more processors to:
obtain a first request for a first user to access a metadata collection providing a semantic layer for a query of a data source;
determine whether the metadata collection corresponding to the query is stored in the in-memory cache storage;
retrieve the metadata collection from the in-memory cache storage;
provide the first user access to the metadata collection based on a first security policy of the first user;
obtain a second request for a second user to access the metadata collection;
provide the second user access to the metadata collection based on a second security policy of the second user, the first user and the second user accessing the metadata collection without the metadata collection being duplicated in the in-memory cache storage;
generate a machine learning model based on records indicating times and frequency of access to the metadata collection;
determine a time period during which requests to access the metadata collection are not predicted based on the machine learning model; and
remove the metadata collection from the in-memory cache storage during the time period.

2. The computer system of claim 1, wherein the computer program code further comprises sets instructions executable by the one or more processors to:
determine that the metadata collection corresponding to the query is not stored in an in-memory cache storage;
determine that the metadata collection is stored at a central management system;
retrieve the metadata collection from the central management system; and
store the metadata collection retrieved from the central management system in the in-memory cache storage.

3. The computer system of claim 1, wherein the computer program code further comprises sets instructions executable by the one or more processors to:
determine that the metadata collection corresponding to the query is not stored in an in-memory cache storage;
determine that the metadata collection is not stored at a central management system;
generate the metadata collection;
store the generated metadata collection in the in-memory cache storage; and
send the generated metadata collection to the central management system for storage.

4. The computer system of claim 1, wherein the computer program code further comprises sets instructions executable by the one or more processors to:
determine a predicted request to access the metadata collection at a predicted time based on the machine learning model.

5. The computer system of claim 4, wherein the computer program code further comprises sets instructions executable by the one or more processors to:
retrieve the metadata collection from a central management system in response to the determination of the predicted request; and
store the generated metadata collection in the in-memory cache storage.

6. The computer system of claim 4, wherein the computer program code further comprises sets instructions executable by the one or more processors to:
generate the metadata collection in response to the determination of the predicted request; and
store the generated metadata collection in the in-memory cache storage.

7. One or more non-transitory computer-readable media storing computer program code comprising sets of instructions to:
obtain a first request for a first user to access metadata collection providing a semantic layer for a query of a data source;
determine whether the metadata collection corresponding to the query is stored in an in-memory cache storage;
retrieve the metadata collection from the in-memory cache storage;
provide the first user access to the metadata collection based on a first security policy of the first user;
obtain a second request for a second user to access the metadata collection;
provide the second user access to the metadata collection based on a second security policy of the second user, the first user and the second user accessing the metadata collection without the metadata collection being duplicated in the in-memory cache storage;
generate a machine learning model based on records indicating times and frequency of access to the metadata collection;
determine a time period during which requests to access the metadata collection are not predicted based on the machine learning model; and
remove the metadata collection from the in-memory cache storage during the time period.

8. The non-transitory computer-readable media of claim 7, wherein the computer program code further comprises sets of instructions to:
determine that the metadata collection corresponding to the query is not stored in an in-memory cache storage;
determine that the metadata collection is stored at a central management system;
retrieve the metadata collection from the central management system; and
store the metadata collection retrieved from the central management system in the in-memory cache storage.

9. The non-transitory computer-readable media of claim 7, wherein the computer program code further comprises sets of instructions to:
determine that the metadata collection corresponding to the query is not stored in an in-memory cache storage;

determine that the metadata collection is not stored at a central management system;
generate the metadata collection;
store the generated metadata collection in the in-memory cache storage; and
send the generated metadata collection to the central management system for storage.

10. The non-transitory computer-readable media of claim 7, wherein the computer program code further comprises sets of instructions to:
determine a predicted request to access the metadata collection at a predicted time based on the machine learning model.

11. The non-transitory computer-readable media of claim 10, wherein the computer program code further comprises sets instructions to:
retrieve the metadata collection from a central management system in response to the determination of the predicted request; and
store the generated metadata collection in the in-memory cache storage.

12. The non-transitory computer-readable media of claim 10, wherein the computer program code further comprises sets of instructions to:
generate the metadata collection in response to the determination of the predicted request; and
store the generated metadata collection in the in-memory cache storage.

13. A computer-implemented method, comprising:
obtaining a first request for a first user to access metadata collection providing a semantic layer for a query of a data source;
determining whether the metadata collection corresponding to the query is stored in an in-memory cache storage;
retrieving the metadata collection from the in-memory cache storage;
providing the first user access to the metadata collection based on a first security policy of the first user;
obtaining a second request for a second user to access the metadata collection;
providing the second user access to the metadata collection based on a second security policy of the second user, the first user and the second user accessing the metadata collection without the metadata collection being duplicated in the in-memory cache storage;
generating a machine learning model based on records indicating times and frequency of access to the metadata collection;
determining a time period during which requests to access the metadata collection are not predicted based on the machine learning model; and
removing the metadata collection from the in-memory cache storage during the time period.

14. The computer-implemented method of claim 13, further comprising:
determine that the metadata collection corresponding to the query is not stored in an in-memory cache storage;
determining that the metadata collection is stored at a central management system;
retrieving the metadata collection from the central management system; and
storing the metadata collection retrieved from the central management system in the in-memory cache storage.

15. The computer-implemented method of claim 13, further comprising:
determining that the metadata collection corresponding to the query is not stored in an in-memory cache storage;
determining that the metadata collection is not stored at a central management system;
generating the metadata collection;
storing the generated metadata collection in the in-memory cache storage; and
sending the generated metadata collection to the central management system for storage.

16. The computer-implemented method of claim 13, further comprising:
generating a machine learning model based on records indicating times and frequency of access to the metadata collection;
determining a predicted request to access the metadata collection at a predicted time based on the machine learning model.

17. The computer-implemented method of claim 16, further comprising:
retrieving the metadata collection from a central management system in response to the determination of the predicted request; and
storing the generated metadata collection in the in-memory cache storage.

18. The computer-implemented method of claim 16, further comprising:
generating the metadata collection in response to the determination of the predicted request; and
storing the generated metadata collection in the in-memory cache storage.

19. The computer system of claim 1, wherein the metadata collection is not re-generated upon receiving subsequent user requests.

20. The computer-implemented method of claim 13, wherein the metadata collection is not re-generated upon receiving subsequent user requests.

* * * * *